No. 712,126. Patented Oct. 28, 1902.
J. FELTON.
HAND DUMP SHOVEL.
(Application filed July 7, 1902.)
(No Model.)
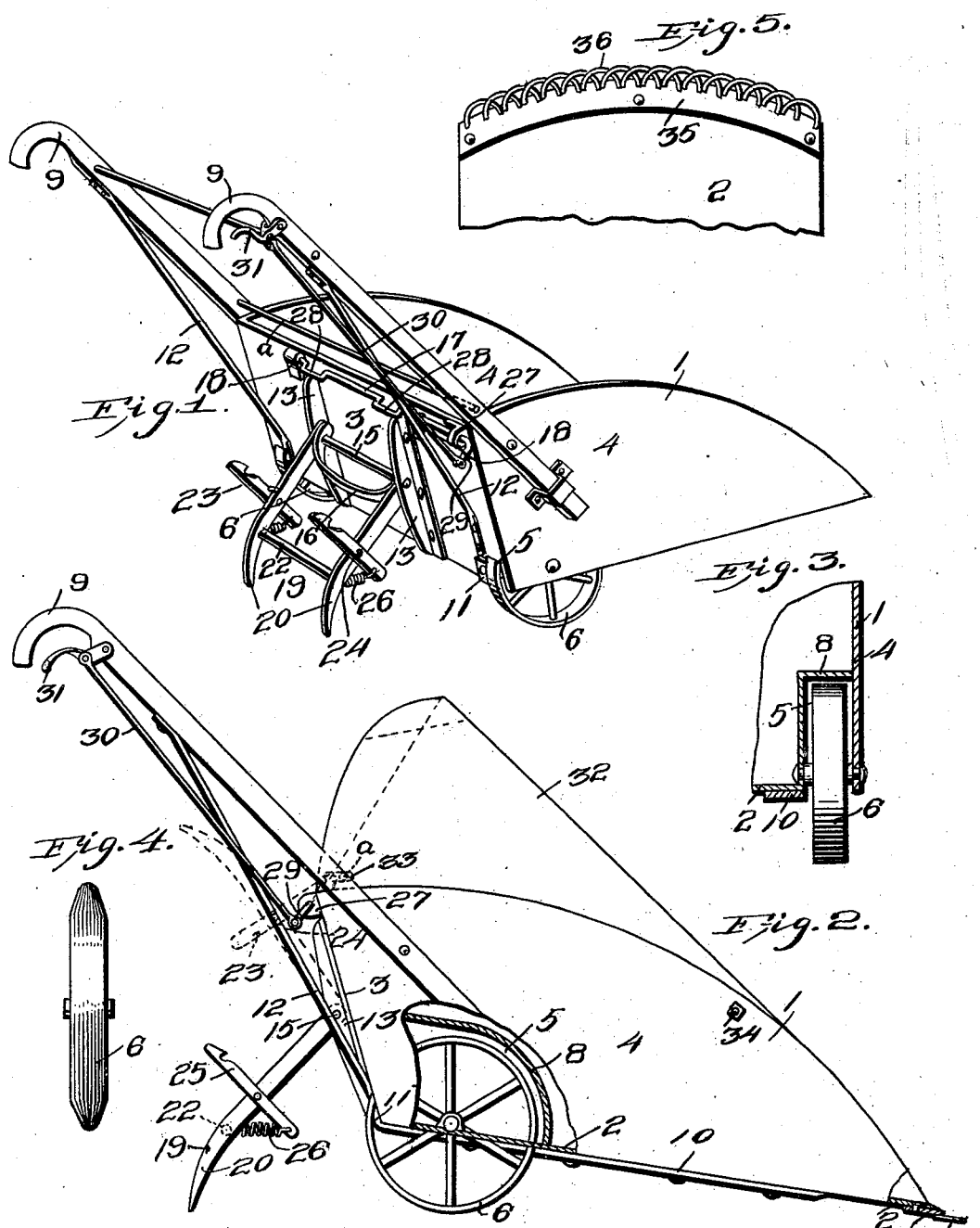
Witnesses
John Felton Inventor
by C. A. Snow & Co
Attorneys

UNITED STATES PATENT OFFICE.

JOHN FELTON, OF FERTILE, MINNESOTA, ASSIGNOR OF ONE-HALF TO GEORGE W. VANDERSLICE, OF FERTILE, MINNESOTA.

HAND DUMP-SHOVEL.

SPECIFICATION forming part of Letters Patent No. 712,126, dated October 28, 1902.

Application filed July 7, 1902. Serial No. 114,638. (No model.)

*To all whom it may concern:*

Be it known that I, JOHN FELTON, a citizen of the United States, residing at Fertile, in the county of Polk and State of Minnesota, have invented a new and useful Hand Dump-Shovel, of which the following is a specification.

My invention is an improved hand dump-shovel adapted for use in moving vegetables, grain, coal, and other material; and it consists in the peculiar construction and combination of devices hereinafter fully set forth and claimed.

The present invention is an improvement on the hand dump-shovel for which Letters Patent of the United States No. 694,263 were granted to me February 25, 1902.

One object of my present improvements is to provide means whereby the dog may be released from its raised position and caused to drop to the ground, the said releasing means being adapted to be operated by one finger of the operator while he is grasping the handles of the dump-shovel.

A further object of my invention is to effect an improvement in the construction of the dump-shovel whereby the same is strengthened.

A further object of my present improvements is to provide a detachable fender nose-piece to be used at the front end of the dump-shovel when the same is employed for moving fruits or vegetables in bulk, the said fender nose-piece preventing the fruits and vegetables from being bruised as they are loaded onto the dump-shovel.

In the accompanying drawings, Figure 1 is a perspective view of a hand dump-shovel embodying my improvements, showing the same in one of its loaded positions. Fig. 2 is a side elevation of the same, partly is section, showing the engaging dog in engaged position with the floor or other surface on which the dump-shovel is operated. Fig. 3 is a detail transverse sectional view. Fig. 4 is a detail view of a modification. Fig. 5 is a detail bottom plan view showing the front portion of the shovel provided with a detachable nose-piece.

In the embodiment of my invention here shown the shovel or body 1 is substantially in the form of a scoop and comprises the bottom 2, the rear wall 3, and the side walls 4. In practice the said body or shovel may be made of sheet iron or steel or any other suitable material. In the bottom of the shovel or body, at the sides thereof and at a suitable distance from the front thereof, are longitudinal openings 5. Suporting-wheels 6 have their upper portions disposed in the said openings, and the said wheels are mounted on axles 7, which have their bearings in the side walls of the shovel or body and in covers 8, which are disposed over the said openings and the said wheels. The latter enable the shovel or body to be readily trundled from place to place and serve to support the shovel or body and the load therein when the front end of the said shovel or body is raised.

To enable the shovel or body to be operated and moved from place to place, I provide a pair of handles 9. The front ends of the same are secured on the side walls of the shovel or body at the rear upper corners thereof, either as shown in Fig. 1 of the drawings or by any other suitable means. The bottom of the body or shovel is reinforced by a pair of longitudinally-disposed metallic straps 10, which are riveted or otherwise secured under the bottom of the body or shovel near the sides thereof and just within the openings 5, and the rear ends of which reinforcing-straps are upturned and riveted or otherwise secured to the rear wall of the body or shovel, as shown in Figs. 1 and 2 at 11.

On the rear side of the shovel or body are secured the front ends of a pair of brace-rods 12, the rear upper ends of which are secured to the under sides of the handles 9.

A pair of vertically-disposed cleats 13 are secured on the rear side of the body of the shovel at a suitable distance apart. The said cleats are here shown as angle-irons and are connected together by a rod 15.

A dog 19, which is here shown as formed of a pair of prongs 20, is pivoted at its upper end to said rod 15. A curved brace-bar 16 connects the upper ends of the prongs or arms 20 of the dog together. Said prongs or arms of the dog are also connected together by a foot bar or rod 22. The said dog is adapted to be turned downwardly, so that its prongs may engage the floor or surface on which the hand dump-shovel is operated, or it may be turned upwardly to raise the prongs from their said engaging position. I provide a catch 23, which is pivoted, as at 24, to the said dog and is here shown as of substantially the form of the letter U and provided with a pair of hooks 25. The said catch 23 is actuated by a spring or springs 26, and when the said dog is turned upwardly the said hooks of the said catch are adapted to engage the upper side of the rear wall 3, as indicated in dotted lines in Fig. 2. A rod *a* connects the handles 9 together and is disposed at a point above the rear side of the shovel or body.

A rock-shaft 17 is journaled in bearings 18 on the rear side of the body of the shovel and in a bearing 27, which is at one side of the shovel. Said rock-shaft has portions thereof offset laterally to form cams 28, which lie under the arms of the catch 23 when the latter is engaged with the upper side of the rear wall of the shovel to lock the dog in the elevated position shown in dotted lines in Fig. 2. Said rock-shaft has a downturned rock-arm 29 at one end. A rod 30 has its front end connected to said rock-arm and its rear end connected to a finger-piece 31, which is pivoted to one of the handles 9 and is disposed to lie under the down curved grip portion thereof.

The operation of my invention is as follows: In order to load my improved hand dump-shovel, the same is pushed by the handles 9 and its front side lowered to the ground or floor before reaching the pile of grain or other material and the shovel or body pushed thereinto as far as possible, thus causing the body or shovel to be partly or entirely filled with the material. In the event that this action does not sufficiently load the body or shovel the same must be further urged into the material. To do this, the operator with the finger of one hand draws upwardly on the finger-piece 31, thereby causing the rock-shaft 17 to be partly turned, so that its cam-offsets 28 move upwardly, engage the arms of the catch 23, and disengage the latter from the rear wall of the shovel or body, and hence causing the dog 20 to drop. By means of the handles 9 the operator then alternately raises and lowers the rear end of the body or shovel. On each upward movement of the same the points of the dog are drawn forwardly and engaged with the floor, the operator having one foot on the bar 22, and at each downward movement of the rear end of the body or shovel the leverage of the handles and dog is such as to urge the shovel or body forwardly into the pile. This operation may be repeated until the shovel or body is loaded. Having thus loaded the shovel or body, the handles are depressed until the hooks 25 engage the upper side of the rear wall of the shovel or body, and this action also shifts the center of gravity of the load rearwardly in the shovel or body and balances the same on the wheels 6, as will be understood, and the loaded shovel may be then readily wheeled to the dump.

My improved hand dump-shovel is especially adapted for use for unloading coal or grain from cars and in handling ore in mines. The peripheries of the wheels 6 are flat when the dump-shovel is used in handling coal or ore; but when the same is used in handling grain the peripheries of the wheels are preferably beveled and rounded at the angle formed by the bevels, as indicated in Fig. 4, the wheels when thus fashioned acting to push the grain laterally out of their way, thus avoiding the crushing of the grain.

In Fig. 2 of the drawings I show my improved hand dump-shovel provided with a removable hood 32, which is detachably secured to the sides of the shovel to increase the capacity thereof when the same is to be used for moving commodities of slight weight. This hood is preferably made of sheet metal and of the form shown and is provided in its sides near their rear lower corners with bayonet-slots 33 to engage the rod *a*, that connects the handles 9 together. When the rear end of the hood has been thus engaged, the sides thereof near their front ends are secured to the sides of the shovel by bolts 34.

In Fig. 5 of the drawings I show an attachment which is used when the hand dump-shovel is employed for moving vegetables or fruits in bulk without injuring them. This attachment consists of a nose-piece 35, which may be detachably bolted to the under side of the shovel at the front end thereof. Curved wires 36, which overlap each other, have their ends attached to the under side of said nose-piece, and said wires project forwardly therefrom and from the shovel and adapt the front end of the latter to be run under vegetables or fruits without injury thereto, as will be understood.

I do not desire to limit myself to the precise construction and combination of devices herein shown and described, as it is evident that modifications may be made therein without departing from the spirit of my invention.

Having thus described my invention, I claim—

1. A hand dump-shovel having supporting-wheels on which the same is adapted to be balanced and provided with rearwardly-extending handles, in combination with a pivoted dog adapted to engage the floor or surface on which the shovel is operated, a catch to lock said dog in an elevated position, and a trip device to disengage said catch and thereby cause the dog to drop, substantially as described.

2. A hand dump-shovel having supporting-wheels on which the same is adapted to be balanced and provided with rearwardly-extending handles, in combination with a pivoted dog adapted to engage the floor or surface on which the shovel is operated, a catch to lock said dog in an elevated position, a trip device to disengage said catch and thereby cause the dog to drop, and a finger-piece on one of the handles and connected to said trip device to operate the latter, substantially as described.

3. A hand dump-shovel having supporting-wheels on which the same is adapted to be balanced and provided with rearwardly-extending handles, said dump-shovel having reinforcing-cleats on its rear side, and a dog pivoted to said reinforcing-cleats, substantially as described.

4. A hand dump-shovel having supporting-wheels on which the same is adapted to be balanced and provided with rearwardly-extending handles, in combination with a pivoted dog adapted to engage the floor or surface on which the shovel is operated, a catch to lock said dog in an elevated position, a cam to disengage said catch and thereby cause the dog to drop, and means to operate said cam, substantially as described.

5. A hand dump-shovel having supporting-wheels on which the same is adapted to be balanced and provided with rearwardly-extending handles, in combination with a pivoted dog adapted to engage the floor or surface on which the shovel is operated, a catch to lock said dog in an elevated position, a rock-shaft having an arm and a cam, the latter being adapted when the rock-shaft is turned to trip said catch and release the dog, a finger-piece on one of the handles, and a connection between said finger-piece and rock-arm, substantially as described.

6. A hand dump-shovel having a nose-piece provided with fender-wires extending forwardly therefrom, substantially as described.

7. A detachable shovel nose-piece having fender-wires extending from the front edge thereof, substantially as described.

8. A detachable shovel nose-piece having curved fender-wires with their ends secured thereto, said curved fender-wires extending in advance of said nose-piece, substantially as described.

9. A shovel having curved fender-wires extending in front thereof and secured thereto, said fender-wires overlapping each other, substantially as described.

In testimony that I claim the foregoing as my own I have hereto affixed my signature in the presence of two witnesses.

JOHN FELTON.

Witnesses:
   G. W. VANDERSLICE,
   F. M. ANDERSON.